United States Patent [19]

Marek et al.

[11] Patent Number: 5,600,074
[45] Date of Patent: Feb. 4, 1997

[54] SILICON CHIP FOR USE IN A FORCE-DETECTION SENSOR

[75] Inventors: Jiri Marek, Reutlingen; Frank Bantien, Ditzingen; Steffen Schmidt, Reutlingen; Kurt Weiblen, Metzingen; Matthias Kuesell, Kornwestheim; Werner Herden, Gerlingen, all of Germany

[73] Assignee: Robert Bosch GmbH, Stuttgart, Germany

[21] Appl. No.: 240,740

[22] PCT Filed: Oct. 16, 1992

[86] PCT No.: PCT/DE92/00870

§ 371 Date: May 10, 1994

§ 102(e) Date: May 10, 1994

[87] PCT Pub. No.: WO93/10430

PCT Pub. Date: May 27, 1993

[30] Foreign Application Priority Data

Nov. 15, 1991 [DE] Germany ............ 41 37 624.2

[51] Int. Cl.$^6$ ........................................... G01L 1/10
[52] U.S. Cl. ........................ 73/862.625; 73/DIG. 4; 257/419
[58] Field of Search ............ 73/DIG. 4, 862.625, 73/862.637, 862.68, 721; 257/418, 419; 338/4

[56] References Cited

U.S. PATENT DOCUMENTS

| | | | |
|---|---|---|---|
| 4,047,144 | 9/1977 | Wong | 257/419 X |
| 4,129,042 | 12/1978 | Rosvold | 73/727 |
| 4,672,411 | 6/1987 | Shimizu et al. | 257/419 |
| 4,766,655 | 8/1988 | Hickox | 73/DIG. 4 X |
| 4,790,192 | 12/1988 | Knecht et al. | 73/DIG. 4 X |
| 4,814,856 | 3/1989 | Kurtz et al. | 257/419 X |
| 4,966,039 | 10/1990 | Dell'Acqua | 73/727 |
| 4,993,266 | 2/1991 | Omura et al. | 73/DIG. 4 X |
| 5,062,302 | 11/1991 | Peterson et al. | 73/DIG. 4 X |
| 5,231,301 | 7/1993 | Peterson et al. | 257/419 |
| 5,263,375 | 11/1993 | Okada | 73/862.637 X |
| 5,279,162 | 1/1994 | Takebe et al. | 73/DIG. 4 X |

FOREIGN PATENT DOCUMENTS

| | | |
|---|---|---|
| 0342274 | 11/1989 | European Pat. Off. . |
| 0427261 | 5/1991 | European Pat. Off. . |
| 0454901 | 11/1991 | European Pat. Off. . |
| 3419710 | 11/1984 | Germany . |
| 3702412 | 8/1988 | Germany . |
| 4009377 | 10/1991 | Germany . |
| 2207804 | 2/1989 | United Kingdom . |
| WO92/15851 | 9/1992 | WIPO . |

OTHER PUBLICATIONS

Patent Abstracts of Japan, vol. 8, No. 65 (P–263), & JP, A, 58211615 (Hitachi Seisakusho K.K.) 9 Dec. 1983.

*Primary Examiner*—Richard Chilcot
*Assistant Examiner*—Elizabeth L. Dougherty
*Attorney, Agent, or Firm*—Kenyon & Kenyon

[57] ABSTRACT

A force sensor employing a silicon chip having a force application area on a top surface and attached to a support at a bottom surface. Piezoresistive elements are arranged on the silicon chip in areas of high mechanical tension and produce signals. Circuits, which receive the signals produced by the piezoresistive elements, are arranged on the silicon chip in areas of low mechanical tension. The areas of mechanical tension may be influenced by providing grooves and/or recesses in the bottom surface of the silicon chip and by providing grooves in the top surface of the silicon chip.

8 Claims, 9 Drawing Sheets

SILICON CHIP FOR USE IN A FORCE-DETECTION SENSOR

BACKGROUND OF THE INVENTION

The present invention is related to a silicon chip for use in a force sensor used, for example, to measure pressure in the combustible chamber of internal engines. The force sensor has at least one piezoresistive element producing signals and circuits for evaluating the signals of the piezoresistive elements. Silicon chips for use in force sensors, and in particular for detecting pressure in the combustion chamber of internal combustion engines, in which the force is applied to the silicon chip by way of a stamp have been described in German Patent Application No. 41 061 020. The silicon chip contains piezoresistive elements having a resistance which changes when subjected to a force. The signals produced by these piezoresistive elements are preprocessed by circuits, also present on the chip, and forwarded, via leads, to other circuits external to the chip. Unfortunately, such known silicon chips provide no means of protecting the circuits from the disruptive influence of mechanical strains. Therefore, it is an object of the present invention to provide a silicon chip including components which are protected from mechanical strains.

SUMMARY OF THE INVENTION

The present invention achieves the above object by advantageously arranging piezoresistive elements in an area of the silicon chip which will experience high mechanical tension, and arranging the circuits in an area of the silicon chip which will experience low mechanical tension. This arrangement maximizes the signal produced by the piezoresistive elements and minimizes the interference of the circuits.

By arranging four piezoresistive elements around the force application area of the silicon chip, two having their longitudinal direction oriented parallel to the force application area and two having their longitudinal direction oriented perpendicular to the force application area, the evaluation of the signals produced by the piezoresistive elements using, for example, a bridge circuit, is greatly simplified. The use of two piezoresistive elements of the same orientation in the force application area is particularly space-saving.

For non-symmetrical configurations of the silicon chip, arranging four piezoresistive elements on a measurement line, two having their longitudinal direction oriented parallel to the line and two having their longitudinal direction oriented perpendicular to the line is particularly advantageous. Once again, a bridge circuit having four piezoresistive elements simultaneously arranged in the area of greatest mechanical tension is possible.

In a simplified configuration of the silicon chip according to the present invention, a solid piece of silicon has a force application area in its center and the circuits are provided on a peripheral area of the silicon chip. The circuits can be effectively decoupled from the mechanical tensions of the force application area by introducing grooves on the top surface of the silicon chip arranged between the force application area and the circuits.

If the bottom surface of the silicon chip is structured with grooves, the circuits on the top surface of the silicon chip are less severely strained by the etching processes used to introduce the grooves. If, in this case, only an area opposite the force application area lies on a support attached to the bottom surface of the chip, the circuits will be effectively decoupled from the force application area. If the force application area is surrounded by a groove on the bottom surface of the chip, the circuits will be mechanically decoupled from the force application area. Further, since the circuits are still above an area of the bottom surface which still contacts the support, the heat generated by the circuits is effectively dissipated via the support. To increase the concentration of tension in the area of the piezoresistive elements, the above structure can also be given a recess in the bottom surface at a center of the area surrounded by the groove.

Mechanical tensions between the silicon chip and the support can also be reduced through the use of a non-symmetrical arrangement in which only an area on the edge of the bottom surface of the silicon chip is joined to the support.

By introducing a groove on the bottom surface of the silicon chip which surrounds the force application area by approximately 270° and by further providing a recess in the bottom surface at an area surrounded by the groove, the area of the silicon chip deformed by the applied force is essentially configured as a bending bar fixed on one end. Correspondingly, by introducing two parallel grooves in the bottom of the silicon chip and reducing the thickness between these grooves, the deformed area of the silicon chip is configured as a bending bar fixed on both ends. The mechanical tensions which occur at the end of these bending bars when a force is applied to the bending bars are particularly easy to compute. Therefore, the behavior of the silicon chip can be easily and accurately predicted.

DETAILED DESCRIPTION

Figure 1:
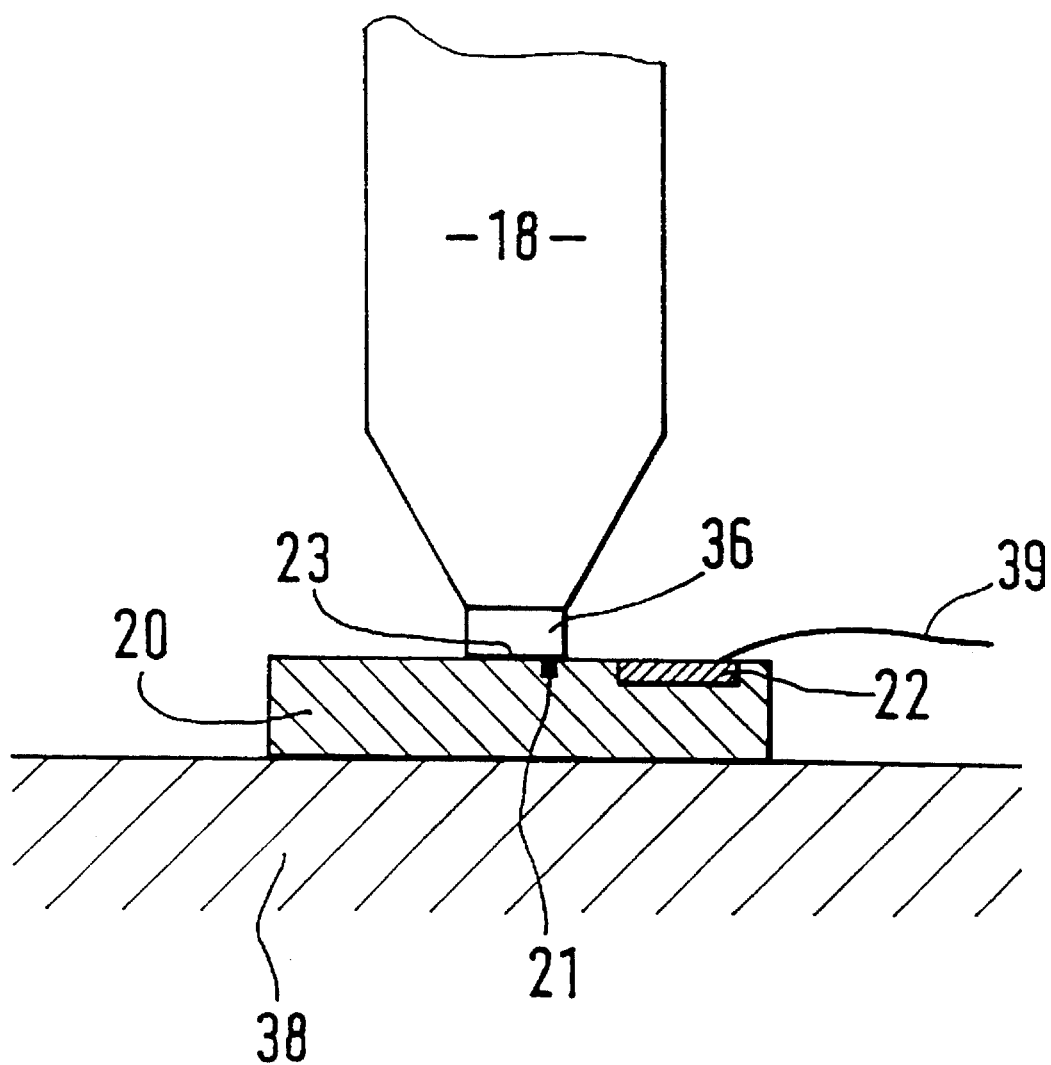
FIG. 1 shows the silicon chip according to the present invention as used in a force sensor.

FIG. I illustrates the use of the silicon chip according to the present invention in a force sensor, as discussed for example, in the subsequently published German Patent Application No. 41 061 020 for a combustion chamber pressure sensor. The silicon chip 20 is arranged on a support 38. A stamp 18 and a separator 36 apply a force to the silicon chip 20. The force application area, i.e. the area of the chip lying directly under the separator 36, is designated as 23. The separator 36 is not absolutely necessary since the stamp 18 can also act directly on the silicon chip. However, the separator 36 is included in all of the remaining figures showing side views of the silicon chip to clearly depict the area in which the force is applied to the silicon chip 20.

The silicon chip is also equipped with piezoresistive elements 21 and circuits 22. The arrangement of the piezoresistive elements 21 and the circuits 22 is a significant aspect of the present invention and is illustrated in more detail in FIGS. 2 through 9. An electrical connection to circuits external to the chip 20 (not shown here) is created via the bonding wires 39. The arrangement shown in FIG. I is built into a housing, the configuration of which is described, for example, in German Patent Application No. 41 061 020.

The remaining figures show a separator 36, a force application area 23 lying under the separator, piezoresistive elements 21 and circuits 22. For the sake of simplicity, the bonding wires 39 and the stamp 18 are not shown. The piezoresistive elements 21 are formed, for example, through a diffusion processes in the material of the silicon chip 20. A mechanical deformation of the silicon causes the resistance of these diffused areas to change. This change in resistance can be detected, for example, by way of metallic connection traces on the piezoresistive elements 21. The piezoresistive elements 21 have a longitudinal direction based on their contacting. This longitudinal direction must be considered when arranging the piezoresistive elements 21 on the surface of the silicon chip 20 since the piezoresistive coefficient of silicon is a function of the crystal direction.

A bridge circuit for pre-evaluating the signals produced by the piezoresistive elements 21 can be contemplated, as an example. The exact orientation of the circuits 22 is insignificant insofar as the concept of the present invention is concerned. However, arranging the circuits 22 in the area of low mechanical tension is important since the possibility of mechanical strains or deformations of the material of the silicon chip 20 influencing their behavior is excluded.

Figure 2A:
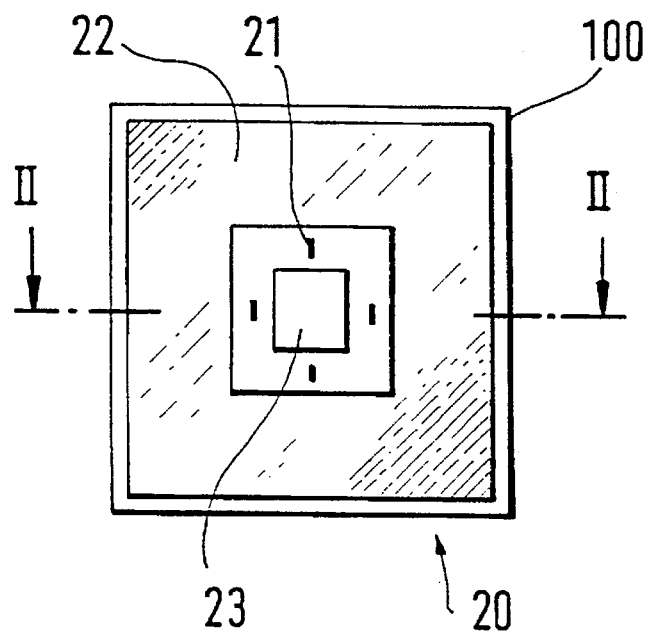
FIGS. 2a and 2b show a top view, and a cross-sectional view, respectively, of an embodiment of the silicon chip.
Figure 2B:
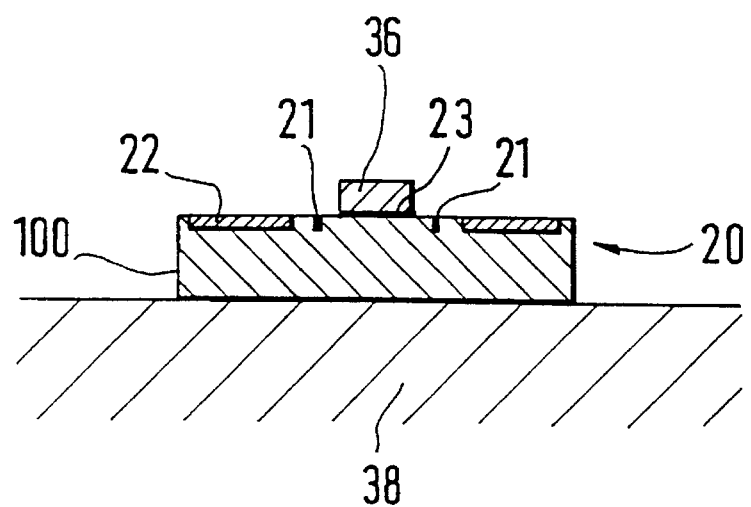

FIGS. 2a and 2b show a particularly simple embodiment of the silicon chip according to the present invention embodying a single piece of silicon 100. FIG. 2a shows the top view of the arrangement of the four piezoresistive elements 21 around the force application area 23. Two of the piezoresistive elements 21 have a longitudinal direction oriented parallel to the force application area 23 and two have a longitudinal direction perpendicular to the force application area 23. The circuits 22 are arranged on the peripheral portion of the chip 20. FIG. 2b shows a cross-sectional side view which illustrates that the bottom surface of the piece of silicon 100 is completely joined to the support 38. In this case, it is advantageous to use the material combinations disclosed in the German Patent Application No. 41 061 020 with suitable coefficients of expansion.

Figure 3A:
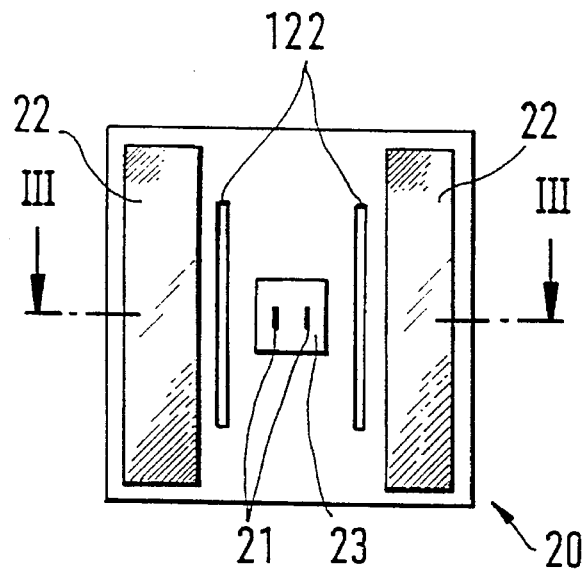
FIG. 3a shows a top view of a silicon chip with grooves introduced into the top surface.
Figure 3B:
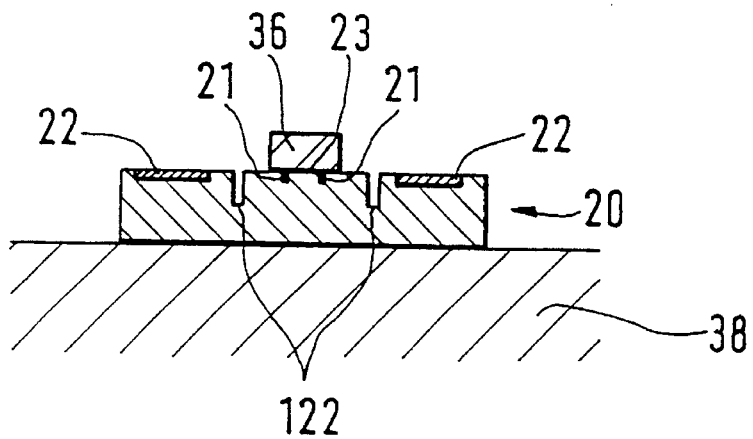
FIGS. 3b and 3c show cross-sectional side views of silicon chips with surfaces having grooves.
Figure 3C:
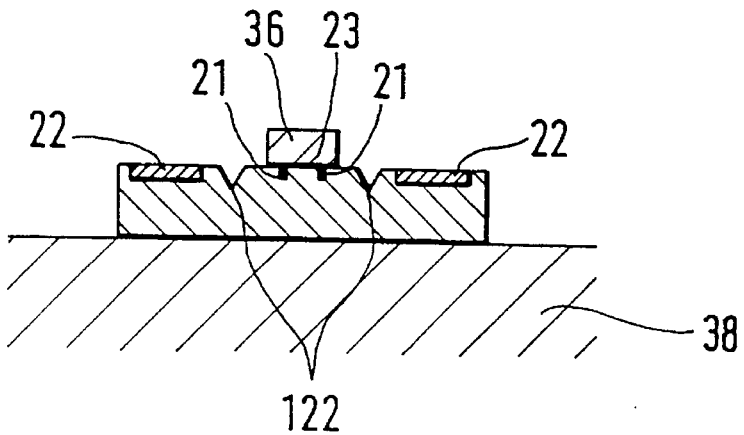

FIGS. 3a–3c show a silicon chip 20 having grooves introduced on the top surface. FIG. 3a shows a top view, and FIGS. 3b and 3c show a cross-section along the line III—III of FIG. 3a. The grooves in FIG. 3b having been created using a different process than the one used to create the grooves in FIG. 3c. In the top view shown in FIG. 3a, the piezoresistive elements 21 are laid in the force application area 23. Grooves 122 are introduced on two sides of the force application area 23. The circuits 22 lie on the side of the silicon chip 20 away from the force application area 23. Due to the directional dependency of the piezoresistive coefficient of silicon, both piezoresistive elements 21 are oriented in the same direction. This orientation direction can be any direction and does not have to be parallel to the introduced grooves 122. The force application area 23 can also be round, for example. The longitudinal length of the grooves 122 should be considerably longer than the expansion of the force application area 23 in this direction. FIG. 3b shows a cross-section through the silicon chip along the line III—III of FIG. 3a. The grooves 122 have a rectangular cross-section. Grooves with a rectangular cross-section can be produced, for example, through wet-chemical anisotropic etching processes in silicon wafers with a {110} orientation. Due to the great anisotropy of these etching processes, grooves are possible with a depth-to-width ratio on the order of magnitude of several hundred. However, the crystal structure of the silicon dictates the position of these grooves on the silicon chips. Grooves having a predominantly rectangular cross-section can be produced using anisotropic plasma etching processes independent of the crystal structure of the silicon. However, the attainable depth-to-width ratio is considerably less than with wet-chemical etching processes. FIG. 3c also shows a cross-section along the line III—III of FIG. 3a. The grooves 122 have a V-shaped cross-section with an opening angle of approx. 70.5°. Grooves having this cross-section can be produced in {100} oriented silicon using wet-chemical etching processes.

Arranging the piezoresistive elements 21 around or in the force application area 23 shown in FIGS. 3a–3c and in FIG. 2a–2b is conceivable for both respective embodiments of the silicon chip according to the present invention.

Figure 4A:
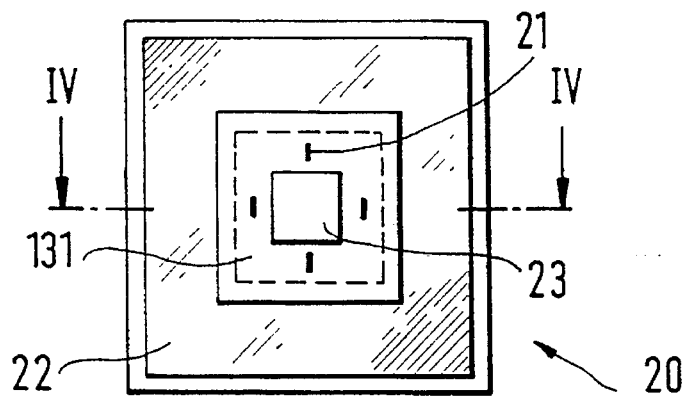
FIG. 4a shows a top view of a silicon chip having a bottom surface which contacts the support only on an area opposite the force application area.
Figure 4B:
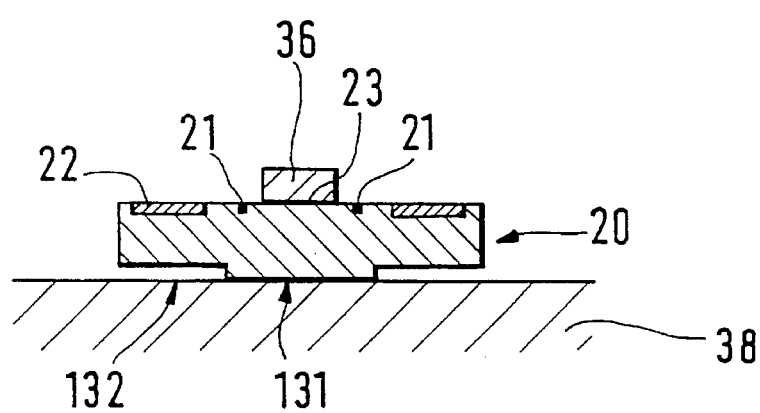
FIGS. 4b–4d show cross-sectional side views of silicon chips which have bottom surfaces which contact the support only on an area opposite their force application area.
Figure 4C:
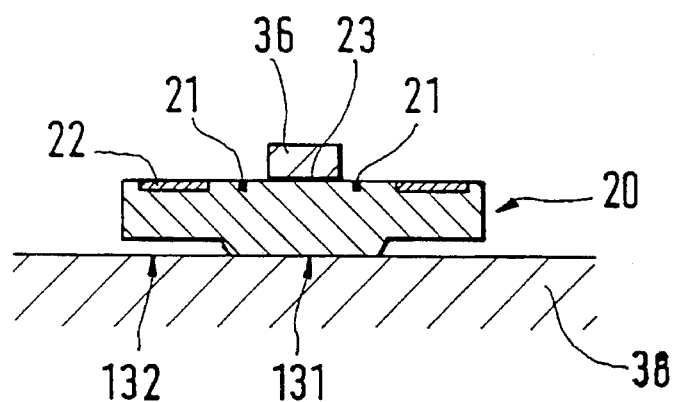

FIGS. 4a–4d show a silicon chip according to the present invention having a bottom side which contacts the support 38 only with an area 131. FIG. 4a shows the top view with four piezoresistive elements 21 arranged around the force application area 23. The circuits 22 are arranged in the area of the silicon chip 20 that is not joined to the support 38 (i.e., a substrate). FIG. 4b shows a cross-section through the silicon chip 20 along the line IV–IV of FIG. 4a. The piezoresistive elements 21 are arranged on both sides of the force application area 23 such that they still lie within the area 131 joined to the support 38. If the two piezoresistive elements 21 are arranged in the force application area 23 (as shown in FIGS. 3a–3c), the area 131 joined to the support 38 can have the same dimensions as the force application area 23. The circuits 22 are arranged on the area 132 of the silicon chip which is not joined to the support 38. Thus the circuits 22 lie in an area in which no mechanical deformations can arise due to the applied forces. The silicon chips 20 shown in FIGS. 4b–4c are made using etching processes on the bottom side of the silicon chip 20. The embodiment shown in FIG. 4b with vertical etching walls can be produced, for example, using plasma etching processes. The embodiment shown in FIG. 4c with slanted walls was produced in {100} oriented silicon wafers using wet-chemical anisotropic etching techniques. While the embodiment shown in FIG. 4b can also be produced using {110} oriented silicon wafers and wet-chemical etching processes, the grooves are no longer orthogonal.

Figure 4D:
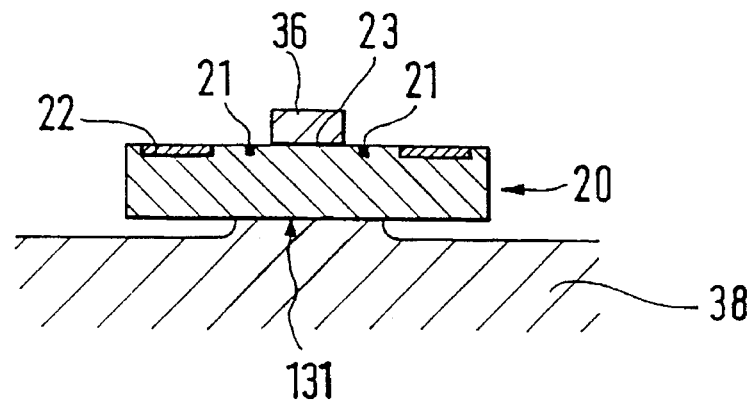

As shown in FIG. 4d, the inventive idea underlying FIGS. 4a–4c can also be realized using a silicon chip according to FIGS. 2a–2b and an appropriately structured support 38. The area 131, which is joined to the silicon chip 20 and support 38, is designed in this case as an elevation of the support 38. If a glass-like support 38 is used, the structuring can take place through etching processes. If a metallic support 38 is used, either etching processes or metal-working surface treatment can be used. In terms of production technology, it is particularly easy to form the elevation of the support 38 through local application, for example using screen printing, of glue for joining the silicon chip 20 and support 38.

Figure 5A:
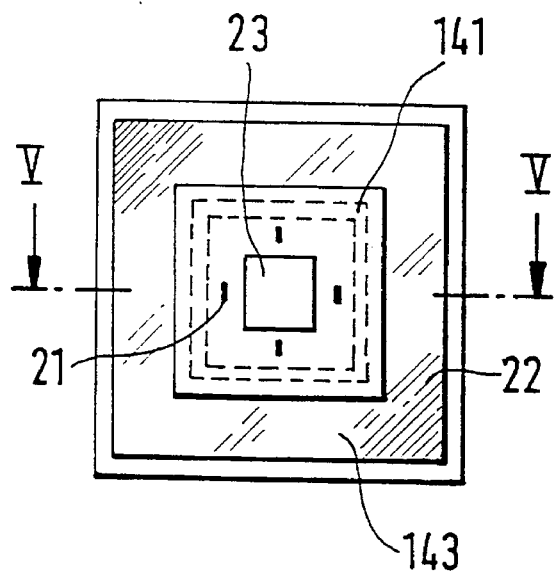
FIG. 5a shows a top view of a silicon chip having a groove, introduced into the bottom surface, which surrounds the force application area.
Figure 5B:
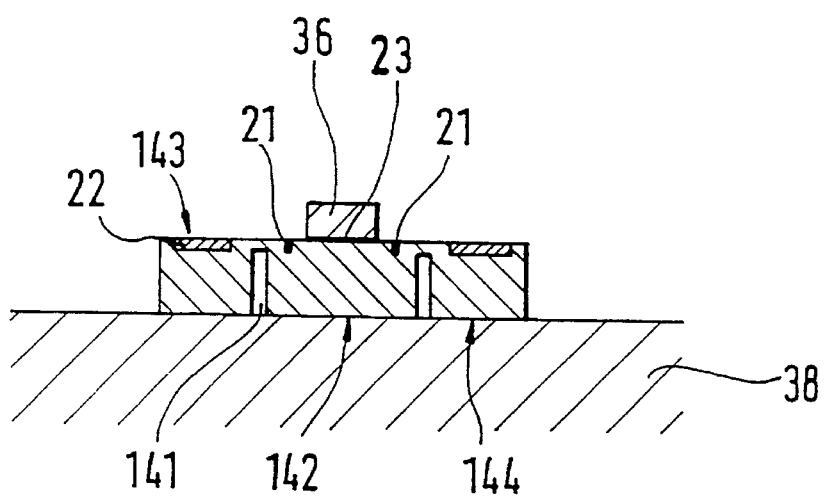
FIGS. 5b and 5c show cross-sectional side views of silicon chips having a groove introduced from the bottom surface.
Figure 5C:
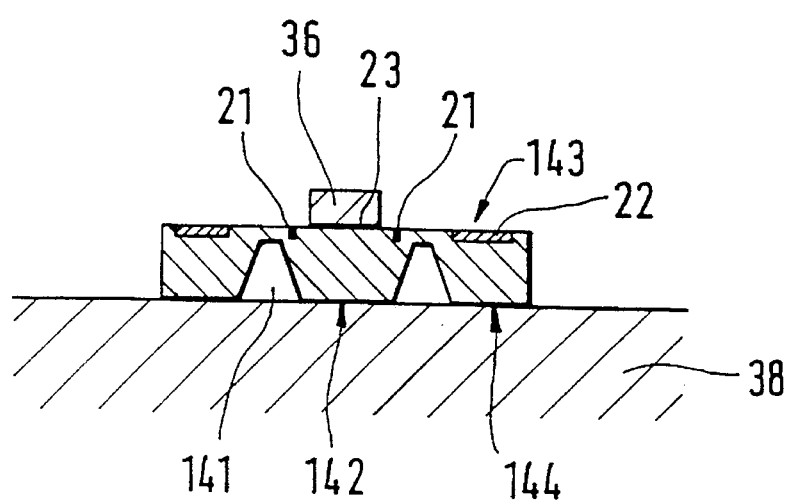

FIGS. 5a–5c show a silicon chip 20 having a groove 141 introduced from the bottom surface 144. The groove 141 completely surrounds an area 142 opposite the force application area 23. FIG. 5a shows a top view, while FIGS. 5b and 5c show a cross-section through line V—V of FIG. 5a. The top view shows four piezoresistive elements 21 arranged around the force application area 23. An analogous arrangement of two piezoresistive elements 21 in the force application area 23 is also possible. The force application area 23 and the piezoresistive elements 21 are surrounded by a rectangular groove 141. Analogously, employing grooves 141 which are round or otherwise shaped is also possible. A low-tension area 143 lies on the side of the groove 141 away from the force application area 23. The circuits 22 are arranged in the low-tension area 143.

The cross-section in FIG. 5b shows a groove 141 with a rectangular cross-section. This groove 141 was produced using anisotropic plasma etching processes. Since these etching processes are independent of the crystal orientation of the silicon, they can also be used to produce groove geometries which are circular from the top view. FIG. 5c shows a cross-section through a silicon chip 20 with a {100} orientation having a groove 141 produced using wet-chemical anisotropic etching processes. The trapezoidal cross-section of the groove 141, which has sloped side walls forming an angle of approx. 70.5° with one another, is achieved through timed inspection of the etching depth or through the use of an etching resist layer on the top side of the silicon layer. The groove 141 effectively mechanically decouples the circuits 22 from the force application area 23. However, since the areas 143 on which the circuits 22 are arranged are mechanically joined with the support, heat arising in the circuits 22 can be easily dissipated via the support 38.

Figure 6A:
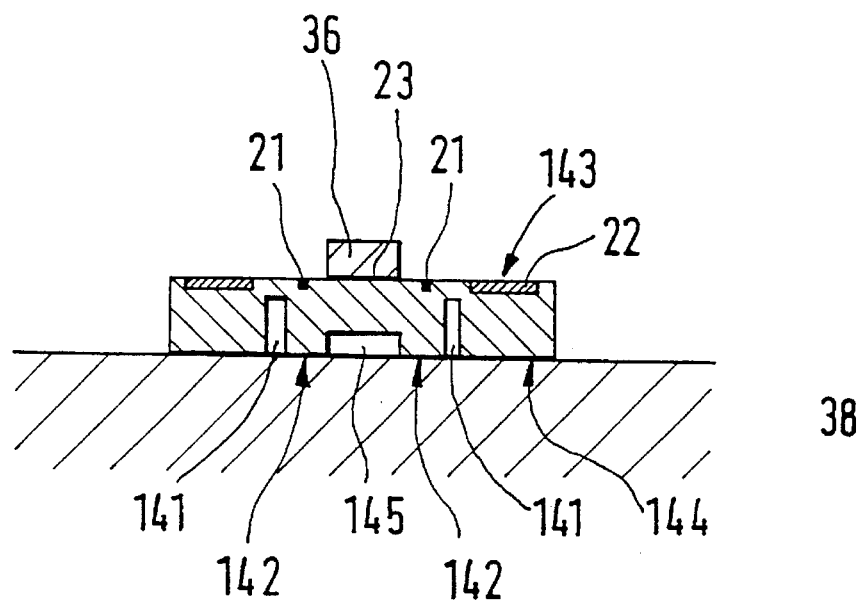
FIGS. 6a and 6b show cross-sectional side views of a silicon chip according to FIGS. 5b and 5c, respectively, with an additional recess on the bottom side.
Figure 6B:
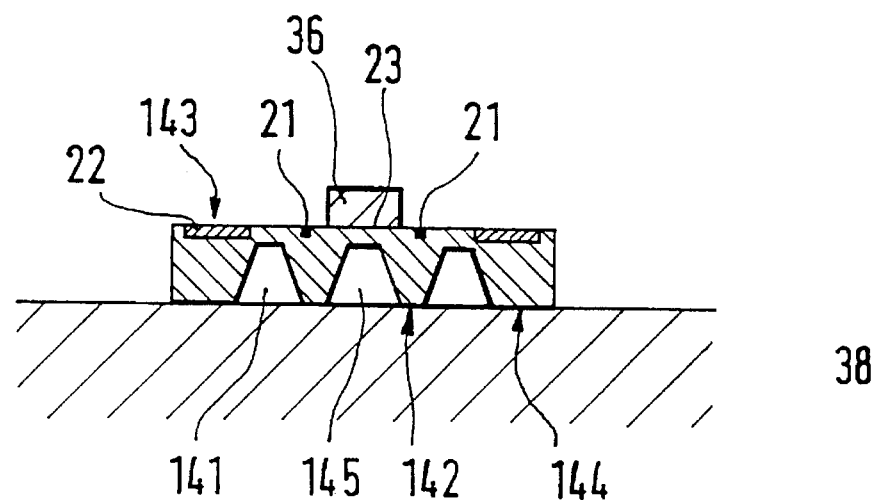

FIGS. 6a and 6b show an improved configuration of the silicon chip 20 shown in FIGS. 5a–5c. FIGS. 6a and 6b each depict a cross-section along the line V—V of FIG. 5a. The silicon chips 20 shown in FIGS. 6a and 6b have, in addition to the groove 141 already known from FIGS. 5a–5c, a recess 145 on the bottom surface of the silicon chip 20. The recess 145 lies opposite the force application area 23 and has approximately the same geometrical shape. The recess 145 reduces the area of silicon chip 20 and support 38 which is surrounded by the groove 141. The mechanical forces applied to the force application area 23 are thus transferred to the support 38 via a reduced area. The resulting concentration of tension in the area of the piezoresistive elements 21 results in a stronger signal from the piezoresistive elements 21.

The configuration shown in FIG. 6a with grooves 141 and a recess 145 having a rectangular cross-section is produced using anisotropic plasma etching processes. Since, as shown here, the groove 141 has a different depth than the recess 145, this etching process must take place in two steps. The configuration shown in FIG. 6b with trapezoidal etching grooves in 100 oriented silicon arises through the use of wet-chemical anisotropic etching processes. Since the groove 141 and the recess 145 have the same depth, the production of this sensor requires only a single etching step. When using grooves 141 or recesses 145 with a triangular cross-section, varying depths can also be realized in one etching step since the etching depth of triangular grooves in 100 silicon is essentially dependent on the width of the groove.

Figure 7A:
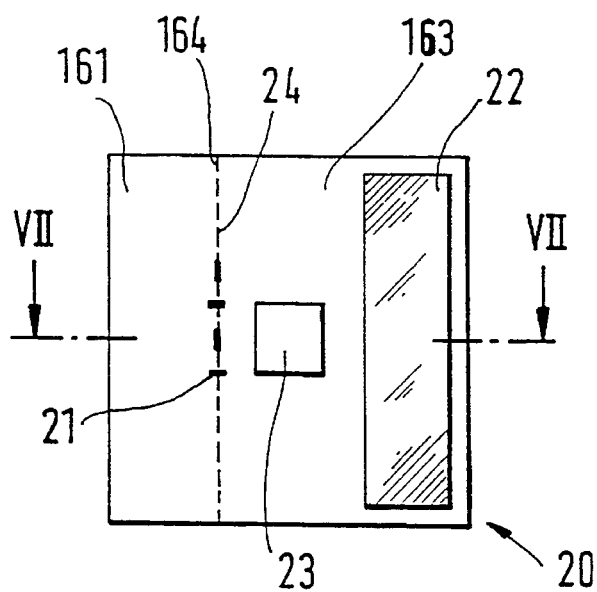
FIG. 7a shows a top view of a silicon chip having a bottom surface which is joined to the support only in a border area.
Figure 7B:
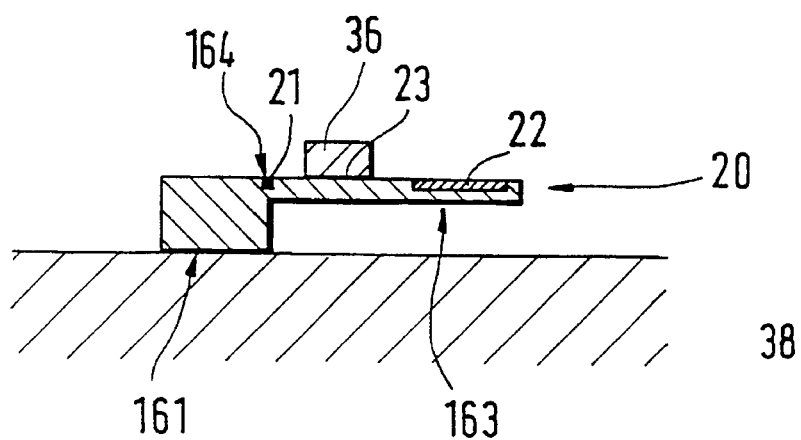
FIGS. 7b and 7c show cross-sectional side views of chips having bottom surfaces which are joined to the support only in a border area.
Figure 7C:
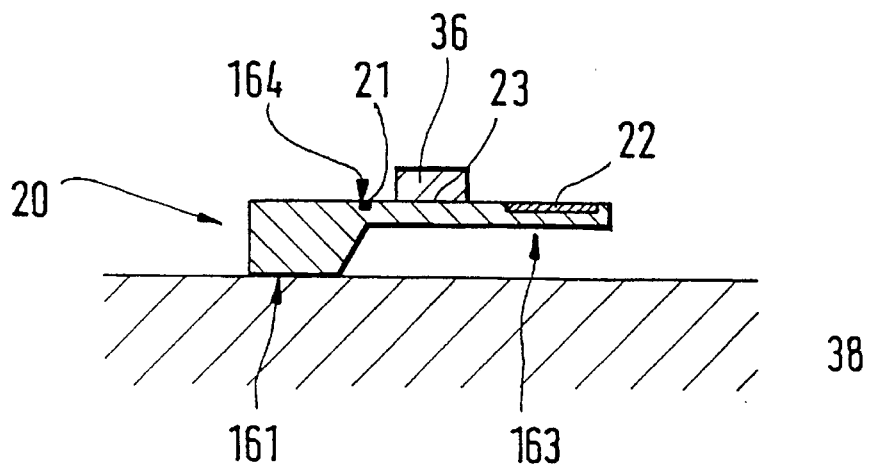

FIGS. 7a–7c show a silicon chip 20 having a bottom surface which is joined with the support 38 only in a border area 161. FIG. 7a shows a top view, while FIG. 7b and FIG. 7c each show a cross-section along the line VII—VII of FIG. 7a. As can be seen in the cross-sections, the piezoresistive elements 21 are laid between the force application area 23 and the area 161 which is Joined to the support 38. The circuits 22 are arranged on the other side of the force application area 23 in the area 163 which is not joined to the substrate. The piezoresistive elements are arranged on a measurement line 24, the measurement line 24 being defined by the boundary 164 between area 161 joined to the support 38 and the area 163 not joined to the support 38. As shown in FIG. 7a, two of the four piezoresistive elements 21 have their longitudinal direction oriented parallel to the measurement line 24 and two have their longitudinal direction oriented perpendicular to the measurement line 24. The cross-sectional drawings, FIGS. 7b and 7c, clarify the arrangement of the piezoresistive elements 21 on the boundary 164.

By applying a force to the force application area 23, the section 163 which is not joined to the support 38 and which has a reduced thickness, is bent towards the support 38. The greatest mechanical deformation and thus also the greatest mechanical tensions occur at the boundary 164 between the anchored area 161 and the unanchored area 163. The circuits 22 are arranged on the area 163, which is not joined to the support 38, since it is subject to almost no mechanical tensions. The exemplified embodiment shown in FIG. 7b with a vertical wall between the joined area 161 and the unjoined area 163 can be produced using either wet-chemical anisotropic etching in {110} silicon or anisotropic plasma etching processes. The exemplified embodiment shown in FIG. 7c with a slanted wall between the joined area 161 and the unjoined area 163 was produced using wet-chemical anisotropic etching in {100} silicon. The upper end of the slanted transition region is understood to be the limit 164 between these two areas.

Figure 8A:
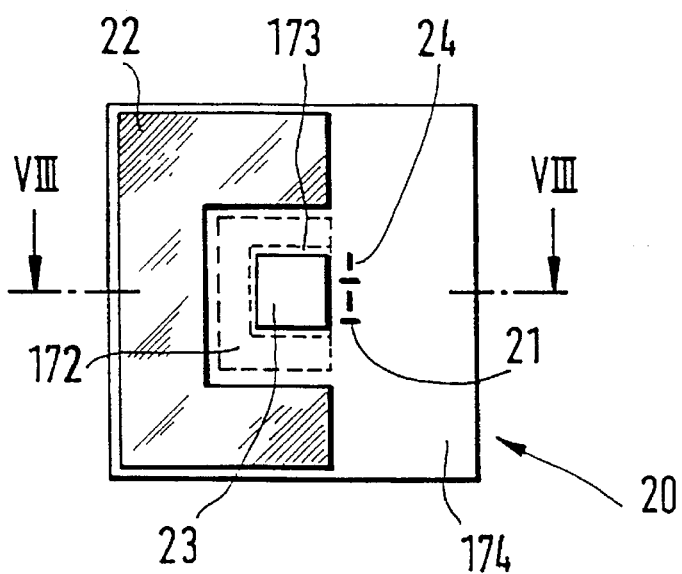
FIG. 8a shows a top view of a silicon chip which has mechanical properties similar to a bending bar fixed on one side.
Figure 8B:
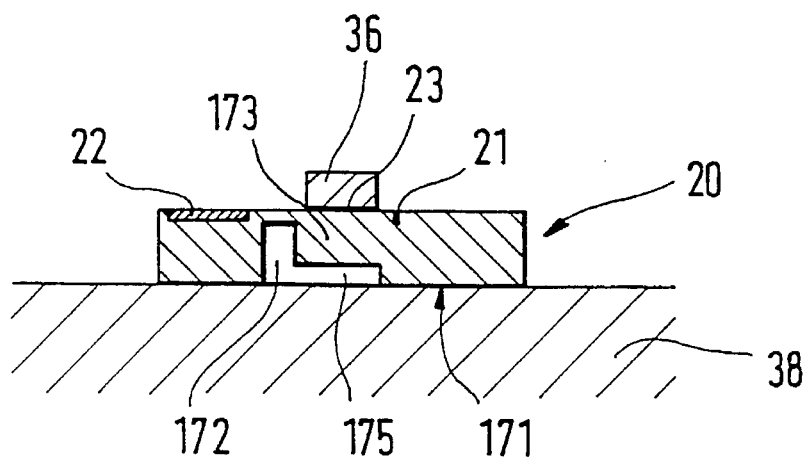
FIGS. 8b and 8c show cross-sectional side views of silicon chips having mechanical properties similar to a bending bar fixed on one side.
Figure 8C:
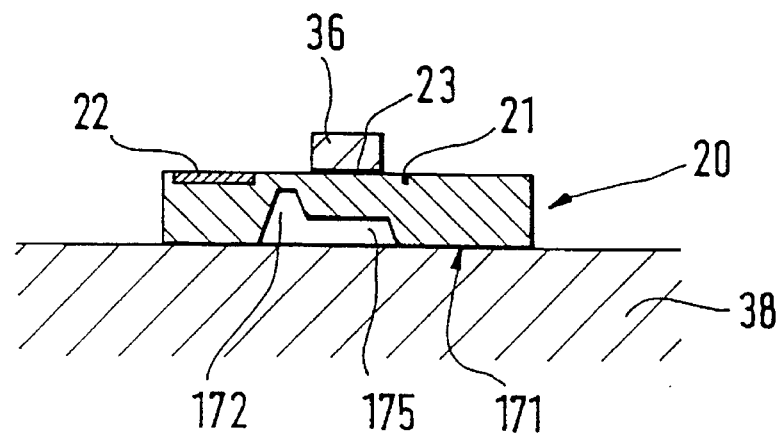

FIG. 8a shows the top view of a silicon chip of the present invention. FIGS. 8b and 8c show a cross-section along the line VIII—VIII of FIG. 8a. As shown in FIG. 8a, three sides of the force application area 23 are surrounded on the bottom side 171 by a groove 172 (i.e., the groove 172 surrounds the bottom side 171 of the application area 23 by approximately 270°). As shown in the cross-section, of FIG. 8b, the area 173 surrounded by the groove 172 has a reduced thickness. The silicon chip 20 is thus designed as a bending bar in the force application area 23. The bending bar formed in this manner is anchored on one side on the area 174 not surrounded by the groove 172. The piezoresistive elements 21 are arranged on a measurement line 24 in the anchored area 174. To ensure that the mechanical tensions which occur in the piezoresistive elements 21 are large, the remaining thickness of the silicon chip over the groove 172 should be small. The circuits 22 are arranged on the side of the groove 172 away from the force application area 23. In this area, the mechanical tensions of the silicon chip are minimal.

The exemplified embodiment according to FIG. 8*b* was produced using anisotropic plasma etching processes. Accordingly, the walls of the groove 172 (or the recess 175) are almost vertical with respect to the surface of the silicon chip 20. The exemplified embodiment in FIG. 8*c* was produced in {100} silicon using anisotropic wet-chemical etching processes.

Figure 9A:
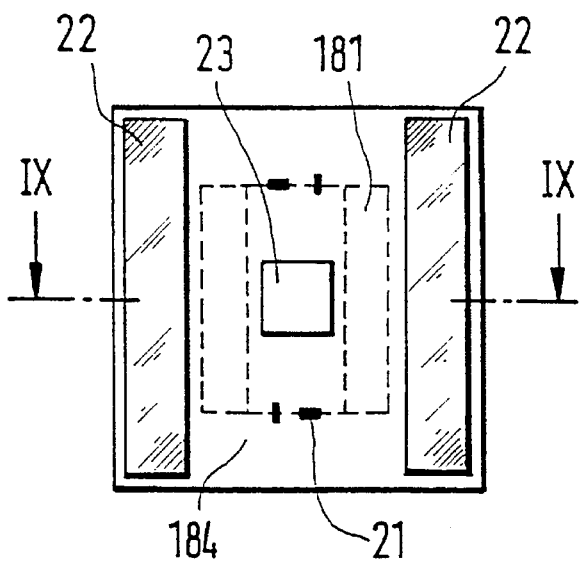
FIG. 9a shows a top view of a silicon chip having mechanical properties similar to a bending bar fixed on two sides.

FIG. 9*a* shows the top view of a silicon chip 20 with two parallel grooves 181 introduced into the bottom surface 183. The force application area 23 lies between these two grooves 181. The silicon chip 20 has a reduced thickness between the two grooves 181 due to a recess 185 on the bottom surface 183. Two piezoresistive elements 21 lie on each of two boundaries 184 between the recess 185 and the remaining area of the silicon chip 20. Of these piezoresistive elements 21, one of each pair has its longitudinal direction oriented parallel to the force application area 23 and one has its longitudinal direction oriented perpendicular to the force application area 23. The circuits 22 lie on the side of the grooves 181 away from the force application area 23. The recess 185 represents a bending bar fixed on two ends. When a force is applied to the force application area 23, the greatest mechanical tensions occur at the fixing points of this bending bar.

The piezoresistive elements 21 are arranged at these fixing points. To ensure that this silicon chip 20 concentrates the mechanical strains in the piezoresistive elements 21 and that the circuits 22 lie in an area of low tension, the remaining thickness of the silicon chip 20 over the grooves 181 should be relatively small. The circuits 22 have good thermal contact with the support 38.

Figure 9B:
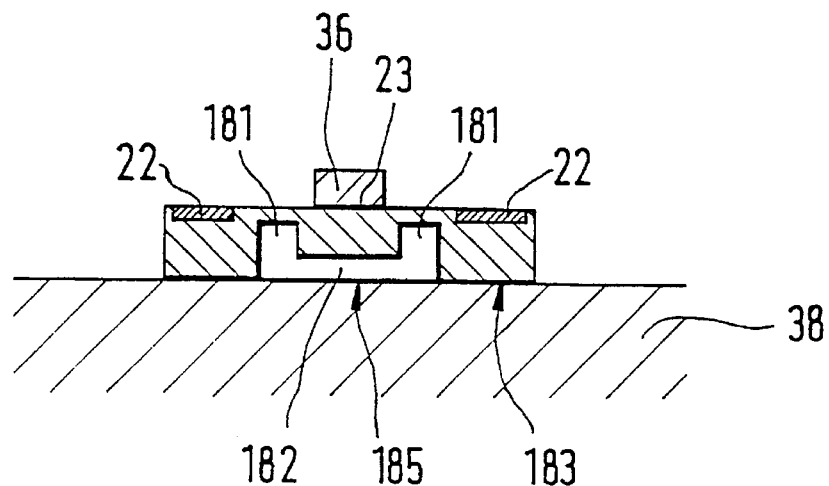
FIGS. 9b and 9c show cross-sectional side views of a silicon chip having mechanical properties similar to a bending bar fixed on two sides.
Figure 9C:
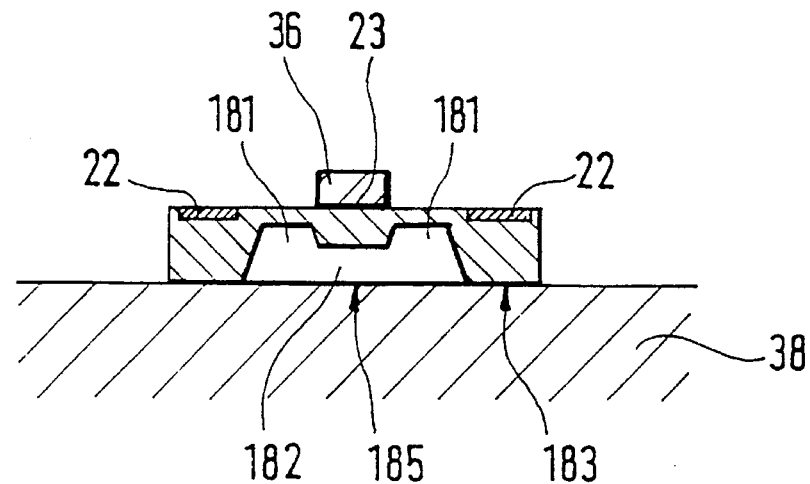

FIG. 9*b* shows a cross-section along the line IX—IX of FIG. 9*a*. The grooves shown in FIG. 9*b* have a rectangular cross-section and are produced using anisotropic plasma etching processes in the silicon chip 20. FIG. 9*c* also shows a cross-section along the line IX—IX of FIG. 9*a*. The grooves 181 and the recess 182 shown in FIG. 9*c* were produced through anisotropic wet-chemical etching in {100} silicon.

We claim:

1. A silicon chip having a force application area on which a stamp presses, for use in a force sensor, comprising:
   a) a piezoresistive element, said piezoresistive element
      i) arranged in an area of high mechanical tension, and
      ii) used to produce signals; and
   b) circuits, said circuits
      i) arranged in an area of low mechanical tension, and
      ii) used to evaluate the signals produced by said piezoresistive element,
   wherein the force application area is located on a top surface of the silicon chip, the top surface including a groove located between said force application area and said circuits, and
   wherein the groove extends to a depth below the top surface which depth is less than a thickness of the silicon chip.

2. The silicon chip of claim 1, wherein:
   the piezoresistive element is arranged in the force application area, and
   the silicon chip has a bottom surface which is arranged on a support.

3. A silicon chip having a force application area on which a stamp presses, for use in a force sensor, comprising:
   a) a first piezoresistive element, said first piezoresistive element
      i) arranged in an area of high mechanical tension, and
      ii) used to produce signals;
   b) circuits, said circuits
      i) arranged in an area of low mechanical tension, and
      ii) used to evaluate the signals produced by said first piezoresistive element; and
   c) a support which contacts a bottom side of the silicon chip only in an area opposite the force application area wherein said circuits lie outside said area.

4. A silicon chip having a force application area on which a stamp presses, for use in a force sensor, comprising:
   a) a piezoresistive element, said piezoresistive element
      i) arranged in an area of high mechanical tension, and
      ii) used to produce signals; and
   b) circuits, said circuits
      i) arranged in an area of low mechanical tension, and
      ii) used to evaluate the signals produced by said piezoresistive element,
   wherein the silicon chip has a bottom surface including a groove, said groove completely surrounding an area of the bottom surface opposite the force application area, and said groove being arranged between the force application area and said circuits,
   wherein the bottom surface of the silicon chip is arranged on a support and wherein at least a portion of the area of the bottom surface completely surrounded by the groove is in contact with the support.

5. The silicon chip of claim 4 wherein the surrounded area has a recess emanating from the center of the bottom surface.

6. A silicon chip having a force application area on which a stamp presses, for use in a force sensor, comprising:
   a) a first, a second, a third and a fourth piezoresistive element, each of said piezoresistive elements
      i) arranged in an area of high mechanical tension,
      ii) having a longitudinal direction, and
      iii) used to produce signals;
   b) circuits, said circuits
      i) arranged in an area of low mechanical tension, and
      ii) used to evaluate the signals produced by said piezoresistive elements; and
   c) a support joining only an edge of a bottom surface of the silicon chip thereby defining a joined area and an unjoined area separated by a boundary,
   wherein said piezoresistive elements are arranged on a first line, said first and second piezoresistive elements being oriented such that their longitudinal direction is along the first line, and said third and fourth piezoresistive elements being oriented such that their longitudinal direction is perpendicular to the first line, and
   wherein the unjoined area of the silicon chip is thinner than the joined area of the silicon chip, the boundary is a straight line, the first line is located along the boundary, and said circuits are arranged on the unjoined area.

7. A silicon chip having a force application area on which a stamp presses, for use in a force sensor, comprising:
   a) a first, a second, a third and a fourth piezoresistive element, each of said piezoresistive elements
      i) arranged in an area of high mechanical tension,
      ii) having a longitudinal direction, and
      iii) used to produce signals;

b) circuits, said circuits
   i) arranged in an area of low mechanical tension, and
   ii) used to evaluate the signals produced by said piezoresistive elements, wherein said piezoresistive elements are arranged on a first line, said first and second piezoresistive elements being oriented such that their longitudinal direction is along the first line, and said third and fourth piezoresistive elements being oriented such that their longitudinal direction is perpendicular to the first line, and wherein the silicon chip has a bottom surface including a groove, said groove surrounding approximately 270° of an area of the bottom surface opposite the force application area, the area of the silicon chip having a reduced thickness at a recess on the bottom surface, the first line arranged along a section of the force application area not surrounded by the groove and the groove being arranged between said circuits and the force application area.

8. A silicon chip having a force application area on which a stamp presses, for use in a force sensor, comprising:

a first piezoresistive element, said first piezoresistive element arranged in an area of high mechanical tension, and used to produce signals;

circuits, said circuits arranged in an area of low mechanical tension, and used to evaluate the signals produced by said piezoresistive element; and a bottom surface having two parallel grooves, wherein the force application area is arranged between the two grooves, the two grooves are arranged between the force application area and said circuits, an area of the bottom surface of the silicon chip between the two grooves has a recess which defines an area of reduced thickness thereby defining two boundaries between the area of reduced thickness and the remaining area of the silicon chip; and a second, a third, and a fourth piezoresistive element, each of said piezoresistive elements having a longitudinal direction, said first and second piezoresistive elements lying on a first of said two boundaries, said first piezoelectric element oriented such that its longitudinal direction is parallel to the first boundary and said second piezoelectric element oriented such that its longitudinal direction is perpendicular to the first boundary, said third and fourth piezoresistive elements lying on a second of said two boundaries, said third piezoresistive element oriented such that its longitudinal direction is parallel to the second boundary and said fourth piezoresistive element oriented such that its longitudinal direction is perpendicular to the second boundary.

* * * * *